Patented Jan. 22, 1952

2,583,451

UNITED STATES PATENT OFFICE 2,583,451

PRODUCTION OF DEXTROSE

Leo Wallerstein, New York, and Philip P. Gray, Forest Hills, N. Y., assignors to Wallerstein Company, Inc., New York, N. Y., a corporation of New York No Drawing. Application April 12, 1948, Serial No. 20,601

4 Claims. (Cl. 195—11)

This invention relates to the manufacture of dextrose.

The present industrial manufacture of crystalline dextrose is essentially based on the conversion of starch to dextrose by means of acid, usually hydrochloric acid, as the hydrolytic agent. In this manufacturing process, economic as well as technical requirements result in the formation of a considerable amount of by-products of little value. Also, the resulting crystallization and separation of crystals involves great difficulty.

One of the chief disadvantages of the acid conversion process is the formation of substantial amounts of reversion products, color bodies and taste-imparting substances. Extremely large seedings are necessitated, and considerable tie-up in equipment and material is involved during the long, slow crystallization process. Very careful temperature control is also an important requirement. Special processes for recycling and reconversion of the mother liquors for efficient yields, and the production of large amounts of hydrol are further obvious disadvantages in the present art.

In co-pending application Serial No. 779,635, Patent No. 2,531,999, of Leo Wallerstein, filed October 13, 1947, there is described a method in which an aqueous dispersion of starch or a starch conversion product is subjected to the action of a microbiological enzyme having starch-glucogenase activity to produce substantially complete conversion to dextrose, the product is maintained at crystallizing temperature, advantageously in the presence of dextrose crystals, until a substantial proportion of discrete dextrose crystals have formed, and the dextrose crystals are separated from the mother liquor.

The process described in this co-pending application requires the expenditure of considerable amounts of energy, in the form of heat, to gelatinize and thin the starch solutions in order to transform the starch into a workable condition. We have found that it is possible by the process herein described to eliminate the gelatinization step and the thinning treatment, thus effecting a substantial saving in equipment and heat consumption.

Furthermore, exposure of the starch to only moderate temperature levels materially reduces the formation of color bodies and undesirable by-products that impart unpleasant taste to either the primary or secondary products.

We have found that raw ungelatinized starches in their native state may be effectively converted into dextrose by subjecting the raw starch to the action of an amylolytic enzyme, such as a bacterial or fungal alpha amylase, together with a starch-glucogenase enzyme. By this method it has been found possible to prepare directly from raw starch suspensions, without the aid of heat, hydrolysates of the requisite dextrose purity, containing greatly reduced amounts of reversion products interfering with crystallization, for the rapid crystallization and separation of discrete crystals of dextrose. When seed crystals are used to facilitate crystallization, only relatively small amounts of seed crystals are needed, in contrast to the large proportions of seed crystals required in the presently used processes for making dextrose.

Typically, the enzyme preparations are added to an aqueous slurry of the raw ungelatinized starch at a pH of between 4 and 7 and the mixture is stirred at a temperature below the gelatinizing temperature of the starch used, typically temperatures between 30° and 50° centigrade. The stirring is continued until the concentration of soluble substances in the supernatant liquor reaches a substantial maximum. The soluble material present in this liquor is substantially all dextrose.

The aqueous dextrose liquor is separated from any unconverted starch by decantation, with filtration if necessary to obtain a clear liquor, concentrated to 60 to 80% solids content and allowed to crystallize. The temperature of crystallization will be determined by the concentration of the liquor being higher with increasing concentration and also being higher for the production of anhydrous dextrose than for dextrose hydrate, the relative temperature ranges suitable for the crystallization of dextrose hydrate and anhydrous dextrose being well-known in the art.

The action of the enzymes is envisioned as occurring in two successive phases, the first being an alpha amylase action which provides the initial attack upon the starch granules thus permitting the starch-glucogenase enzyme to act further. Alpha amylase activity may be conveniently determined by the method of Sandstedt, Kneen and Blish (S. K. B. units), "Cereal Chemistry," vol. 16, page 712 (1939).

Starch-glucogenase activity and a means for determining it have been described in co-pending application of Leo Wallerstein, Serial No. 779,635 Patent No. 2,531,999. The test, briefly, is one in which a 1% Lintner starch solution is subjected to the action of the enzyme being tested under standardized conditions, and the amount of dextrose formed is determined. By adjusting the conditions to certain ranges, a "$k$" value, representing the unimolecular reaction constant, can be calculated as a measure of the activity of the enzyme.

In more detail, the starch-glucogenase activity of the enzyme preparations may be expressed conveniently in terms of the unimolecular reaction constant "$k$" which represents the initial reaction velocity of the formation of dextrose. When tested under prescribed conditions, it has been found that the course of the formation of dextrose from Lintner starch as a result of the starch-glucogenase activity of the enzyme preparation follows the unimolecular reaction law as expressed by the equation $$k = \frac{1}{t} \log 10 \frac{a}{a-x}$$

wherein "$k$" is the unimolecular reaction constant, "$t$" is the time, "$a$" is the initial concentration and "$a-x$" is the concentration of the starch at time "$t$."

For starch-glucogenase activity, the value of "$k$" has been found to be substantially proportional to enzyme activity when tested under conditions such that about 50% hydrolysis is effected on a 1% Lintner starch solution at a pH value of 5.0 and a temperature of 40° C. in 30 minutes. For the determination, 5 mol. of a "test" solution of the enzyme preparation is added to a solution containing 25 ml. of water and 10 ml. of a 1% Lintner starch solution buffered at pH 5.0 and the hydrolysis is allowed to proceed for exactly 30 minutes at 40° C. 2 ml. of a 5% sodium carbonate solution is then added to stop hydrolysis and the volume is made up to 50 ml. with water. The quantity of dextrose formed by the action of the enzyme on the starch is determined colorimetrically by the Tauber and Kleiner method as modified by Gray and Rothchild, Ind. & Eng. Chem., Anal. Ed., 13, 902 (1941). The value of "$k$" for the enzyme "test" solution is defined as calculated from the data thus obtained by the equation $$k(\text{of "test" solution}) = \frac{1}{30} \log \frac{100}{100-X}$$

wherein "$X$" is the percent hydrolysis calculated from the amount of dextrose formed. A "$k$" value, based on 100 grams of the enzyme preparation, is calculated by the equation "$k$"(per 100 gm. enzyme preparation) =
$$\frac{k(\text{of "test" solution}) \times 100}{\text{concentration of enzyme preparation in "test" solution (in grams per 100 ml.)}}$$

The "$k$" value as thus determined and calculated will be used in the specification and claims to designate the starch-glucogenase activity of an enzyme preparation.

The enzymes found suitable for this process may be obtained from various sources. The alpha amylase type of enzyme may preferably be obtained from bacterial sources. We have found that bacterial amylase such as the enzyme obtained from cultures of *B. mesentericus* or *B. subtilis* quite efficient in this process. It is also possible to utilize the alpha enzyme existing in malted cereals, such as in barley malt. We have found that alpha amylases as present in fungal enzyme preparations may also be employed, but occasionally these are not as efficient as those from other sources.

The amount of alpha amylase activity required to react in combination with the starch-glucogenase activity is dependent on several factors among which may be mentioned the source of the enzyme, the rate of digestion desired, temperature, amount of starch-glucogenase enzyme used in combination with it, and the type of starch. The starch-glucogenase enzyme is obtained from fungal sources such as cultures of *Aspergillis oryzae*. In general, to obtain starch hydrolysates which readily form discrete crystals of dextrose, it is desirable to use an amount of alpha enzyme which will produce a sufficient concentration of soluble solids, substantially dextrins and maltose, in the time of digestion desired. It is also necessary to have, in combination with the alpha enzyme, the starch-glucogenase enzyme which will transform the soluble solids into dextrose. Amounts of alpha enzyme from bacterial sources to produce the desired result may have an economical range in alpha amylase content of about 200 to 3500 SKB units per 100 grams of starch. This range represents a satisfactory and convenient range but is not to be construed as limiting this invention. Indeed, conversions may be effected with concentrations as low as 5 SKB units per 100 grams of starch at the sacrifice of the soluble solids content obtained in a given time interval. On the other hand, concentrations exceeding 5,000 SKB units produce higher soluble solids concentrations.

In some cases it has been found that the alpha enzymes from fungal sources are not as efficient as the other enzymes. In these cases it is necessary to use more of the fungal enzyme in order to obtain the requisite digestive action. The amount of starch-glucogenase activity should be such that it will effect substantially complete conversion to dextrose of the soluble solids formed by the alpha enzymes within the time allotted for the hydrolysis. Amounts of starch-glucogenase activity equivalent to a "$k$" value of about 0.005 to 0.05 per 100 grams of starch indicate an economical range for this purpose. The actual amount depends on the rate of digestion desired. Illustrative examples will serve to amplify these points.

The process is very flexible and concentrations and ratios of enzyme activities may be independently varied over wide limits according to the enzyme source, enzyme cost, operating cycle for digestion equipment, and economical limits for concentrating the hydrolysates.

The method of the invention makes possible the production of full yields of crystalline dextrose from starches and starch-containing materials of practically any type or purity. The method can be applied successfully to corn starch, corn meal, wheat flour, wheat starch, tapioca starch, waxy maize starch, potatoes, sweet pototoes, sorghum, and rice. It can also be applied to the raw flours of the whole cereal grains, such as wheat flour, but in these cases the hydrolysates contain various protein bodies and other associated residues in addition to the dextrose.

The following examples are illustrative of the principles of the invention:

*Example 1*

A suspension of 1 part by weight of corn starch in 3 parts by weight of water is adjusted to pH 5.5 and 0.5% (on the weight of the starch) of a fungal enzyme preparation having a starch-glucogenase "$k$" value of about 10, and 0.5% (on the weight of the starch) of a bacterial alpha amylase preparation having an activity of 2200 SKB alpha amylase units per gram of preparation, are added. The mixture is stirred at a temperature below the gelatinizing temperature of the starch used, in this case at about 45° C., for 48 to 72 hours.

The unconverted starch is allowed to settle. The clear supernatant solution containing about 10% of soluble solids is drawn off, filtered if not clear, and evaporated to 65 to 70% solids. 0.1% of seed crystals of dextrose hydrate is added and the material is allowed to crystallize at 20° C. The discrete crystals of dextrose hydrate are separated, purged of mother liquor and dried.

The undigested starch may be combined with additional starch and again treated with the amylolytic and starch-glucogenase enzymes. The mother liquor from which the dextrose crystals have been separated also may be reused for the treatment of further amounts of starch or starch conversion products as is more particularly described in co-pending application of Leo Wallerstein and Irwin Stone, Ser. No. 11,832, filed February 27, 1948, Patent No. 2,567,000.

The mother liquors from the crystallization and separation of the dextrose crystals produced by the method of the invention represent products suitable for food or other valuable use and hence may be either evaporated and sold as syrups or, if desired, they may be returned to any step in the process for further processing.

Example 2

A suspension of one part, by weight, of raw pearl starch in three parts, by weight, of water is adjusted to pH 5.0. The temperature is raised to 40° C. and 1% of a fungal enzyme preparation (starch-glucogenase "$k$"=1.6, alpha amylase activity=3400 SKB units) is added. The mixture is stirred slowly for 72 hours at 30° C. and is then filtered. The clear liquor, which will have a soluble solids content of about 13% is concentrated to a solids content of about 65%. The concentrated liquor is then held at crystallizing temperatures after the addition of about 0.1% of dextrose hydrate seed crystals. When crystallization is complete the mass is centrifuged or filtered and purged of the mother liquor. The undigested starch may be returned to a succeeding batch for further conversion.

Example 3

A suspension of one part by weight of raw pearl starch in three parts by weight of water is adjusted to pH 5.5. The temperature is raised to 30° C. and 1% (on the weight of starch) of malt diastase is added and stirred in. This malt diastase is a purified malt enzyme preparation having an alpha amylase activity of about 500 SKB units per gram. 0.25% (on the weight of starch) of a fungal enzyme preparation having a starch-glucogenase "$k$" value of approximately 10 is added. This mass is slowly stirred for 48 hours and then filtered. The clear liquor will have a soluble solids content of about 8.5% which is substantially all dextrose. It is then concentrated to a solids content of about 65%. The concentrated liquor is then held at about 20° C. with about 1.0% dextrose hydrate crystals. Crystallization will proceed and when completed the mass is centrifuged or filtered and purged of the mother liquor. The undigested starch may be returned to a succeeding batch for further digestion.

We claim:

1. A method of making dextrose which comprises subjecting an aqueous suspension of raw starch to the action of microbiological enzyme material having amylolytic activity equivalent to at least 200 SKB units per 100 grams of starch, and starch-glucogenase activity equivalent to an initial reaction value "$k$" of at least 0.005 per 100 grams of starch to convert a substantial proportion of the starch to dextrose.

2. A method of making dextrose which comprises subjecting an aqueous suspension of raw starch to the action of microbological enzyme material having an amylolytic activity equivalent to from about 200 to 3500 SKB units per 100 grams of starch and starch-glucogenase activity equivalent to an initial reaction value "$k$" of from 0.005 to 0.05 per 100 grams of starch to convert a substantial proportion of the starch to dextrose.

3. A method of making dextrose which comprises subjecting an aqueous suspension of raw starch to the action of microbiological enzyme material having an amylolytic activity equivalent to from about 200 to 3500 SKB units per 100 grams of starch and starch-glucogenase activity equivalent to an initial reaction value "$k$" of from 0.005 to 0.05 per 100 grams of starch to convert a substantial proportion of the starch to dextrose and separating unconverted starch from the aqueous liquor maintaining the aqueous liquor thus obtained at crystallizing temperature at a concentration of from about 60% to about 80% solids until a substantial proportion of discrete dextrose crystals have formed and separating the dextrose crystals from the mother liquor.

4. A method of making dextrose which comprises subjecting an aqueous suspension of raw starch to the action of microbological enzyme material having an amylolytic activity equivalent to from about 200 to 3500 SKB units per 100 grams of starch and starch-glucogenase activity equivalent to an initial reaction value "$k$" of from 0.005 to 0.05 per 100 grams of starch to convert a substantial proportion of the starch to dextrose and separating unconverted starch from the aqueous liquor concentrating the aqueous liquor to a concentration of from about 60% to about 80% solids, maintaining the concentrated liquor at crystallizing temperature until a substantial proportion of discrete dextrose crystals have formed and separating the dextrose crystals from the mother liquor.

LEO WALLERSTEIN.
PHILIP P. GRAY.

REFERENCES CITED

The following references are of record in the file of this patent:

UNITED STATES PATENTS

| Number | Name | Date |
|---|---|---|
| 2,201,609 | Dale et al. | May 21, 1940 |
| 2,302,310 | Glarum et al. | Nov. 17, 1942 |
| 2,305,168 | Langlois | Nov. 17, 1942 |
| 2,442,789 | Walsh et al. | June 8, 1948 |

OTHER REFERENCES

Enzyme Technology by Tauber, 1943 ed., page 165.